Jan. 19, 1943.  W. H. BARLING  2,308,802
AIRCRAFT
Filed June 18, 1940  2 Sheets-Sheet 1

Inventor
Walter H Barling
By Marechal + Noe
Attorneys

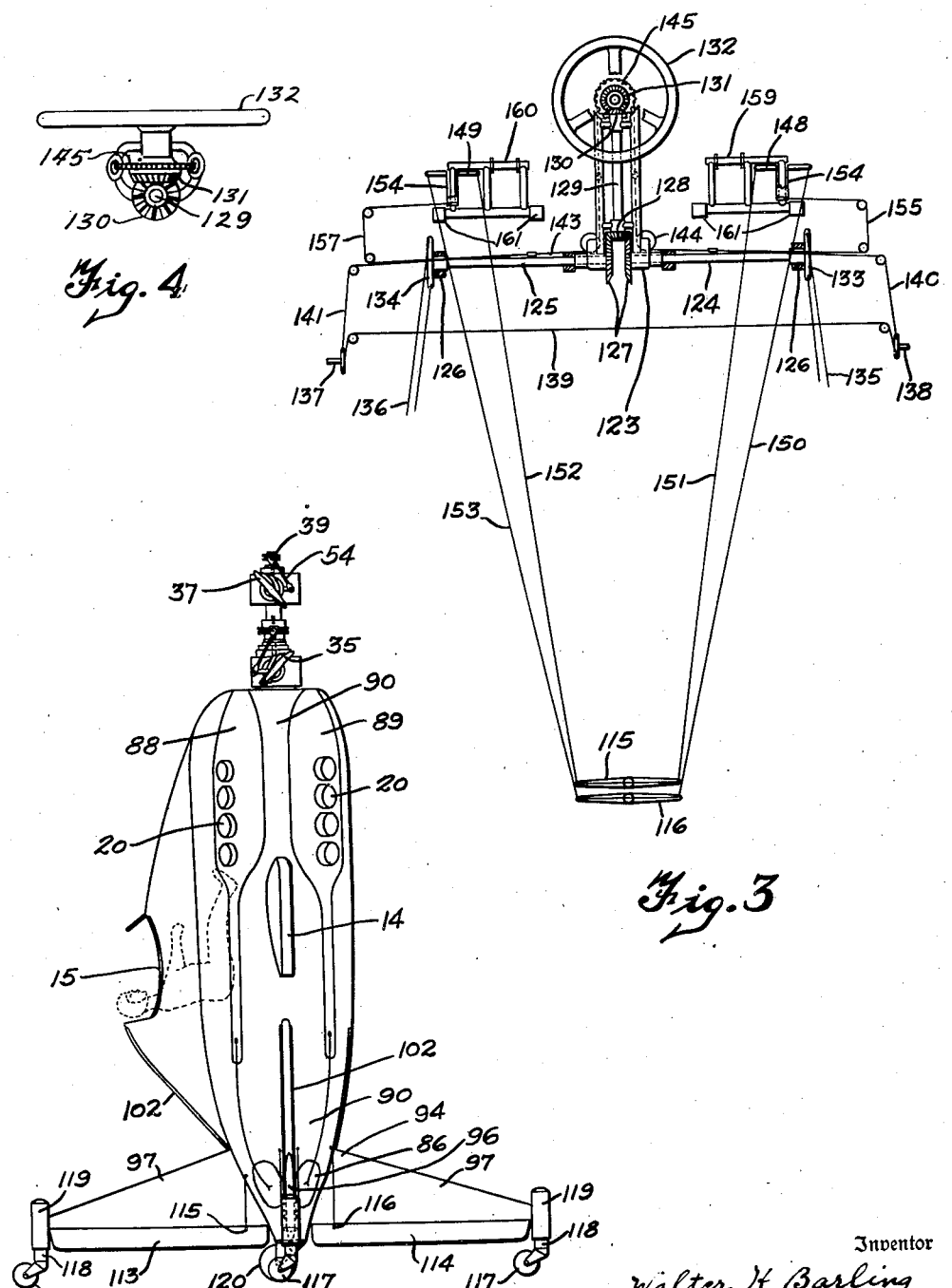

Patented Jan. 19, 1943

2,308,802

UNITED STATES PATENT OFFICE 2,308,802

AIRCRAFT

Walter H. Barling, Santa Cruz, Calif.

Application June 18, 1940, Serial No. 341,169

16 Claims. (Cl. 244—7)

This invention relates to aircraft.

One object of the invention is the provision of an aircraft adapted for high speed travel in normal flight and capable of taking off and landing in a substantially vertical direction.

Another object of the invention is the provision of an aircraft adapted to take off and land substantially vertically, and having a tail structure which is movable axially of the body, with a shock absorbing connection between tail structure and the body for effectively cushioning the shock of landing.

Another object of the invention is the provision, in an aircraft, of a propeller capable of efficient operation at various speeds of travel through the air, and having blade sections that are relatively adjustable to assume different pitch angles at different distances along the blade axis.

Another object of the invention is the provision of an aircraft having a lifting propeller and capable of substantailly vertical flight, the propeller driving engine or engines being releasably connected to the aircraft body on which the propeller is rotatable so that the engines may descend independently of the aircraft body in case of engine failure.

Another object of the invention is the provision of an aircraft adapted to take off and land vertically and having control surfaces which act during horizontal flight, as rudders, and elevators, and which are differentially moved under the control of the operator for roll control.

Other objects and advantages of the invention will be apparent from the following description, the appended claims, and the accompanying drawings.

In the drawings,

Fig. 2 is a side elevation of the aircraft;

Fig. 3 is a plan of the controls; and

Fig. 4 is a top view of the control column.

Figure 1:
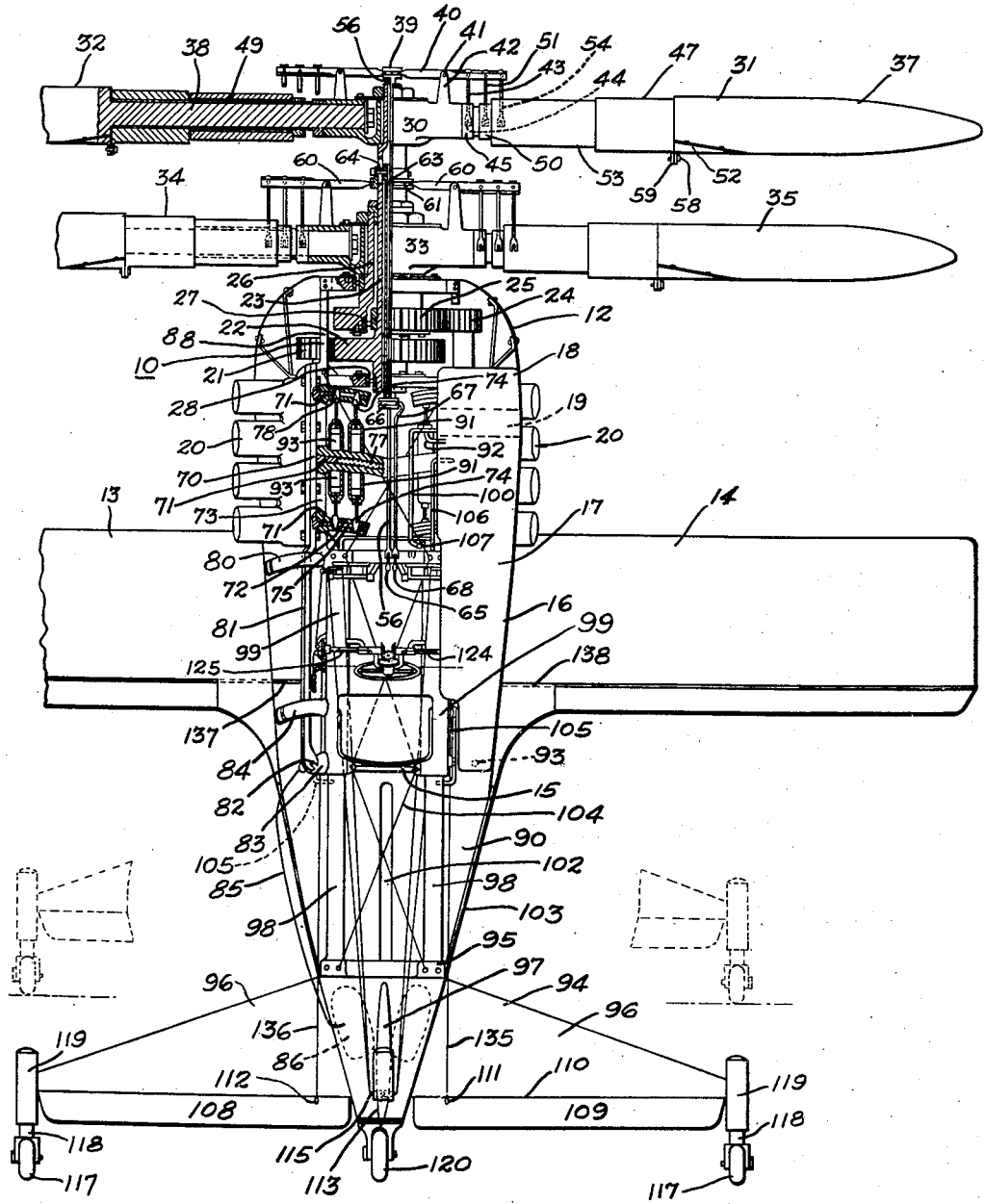
Fig. 1 is a plan view of an aircraft embodying the present invention, and shown partly in longitudinal section.

The drawings show a preferred embodiment of the invention in an aircraft adapted to take off and land in a vertical direction and adapted for high speed flight in a substantially horizontal attitude. Referring more particularly to the drawings, in which the same reference numerals have been used to designate like parts in the several views, 10 generally designates the body portion of the main frame structure. This body portion includes rigid structural members and is provided with a covering 12 of substantially streamline form. Projecting laterally from the body portion, the main frame structure includes wings 13 and 14 which act as sustaining surfaces in horizontal flight, the length of the wings being comparatively small, as will be apparent from Fig. 1.

Within the body 10 is a pilot's seat 15 arranged somewhat to the rear of the center of gravity which is adjacent the center of lift of the wings. At each side of the body is a tank 16, having a compartment 17 for gasoline and additional compartments 18 for the engine oil and 19 for shock absorber oil. One of the tanks only is shown in Fig. 1, another tank at the left side of the body being of the same construction as the one shown. Any suitable number of engines may be employed for driving the propeller or propellers, the construction illustrated embodying four engines 20 the longitudinal axes of which are parallel to the longitudinal axis of the aircraft. On the crankshaft of one of the engines 20 is a drive gear 21 which meshes in normal operation with a gear 22 fixed on one of the propeller shafts such as the propeller shaft 23. A second engine, preferably the one diametrically opposite, is similarly connected to the propeller shaft 23, while the third and fourth engines are provided with drive gears 24 meshing with a gear 25 on the other propeller shaft 26.

The propeller shaft 23 is rotatably mounted by means of suitable antifriction bearings 27 and 28 in line with the body axis and carries the propeller hub 30 of the upper propeller which has blades 31 and 32 of considerable length which may be pivotally connected to the hub for movement about hinge axes for auto-rotational operation. The length of these blades is preferably such that they extend out about as far as the ends of the wings from the body axis. The lower propeller includes the hub 33, fixed to the propeller shaft 26, and the blades 34 and 35. As shown, the two propellers are adapted for rotation in opposite directions and are provided with blade sections the axes of which bear a fixed relation to the axis of the propeller shaft, although the invention is not to be limited to such arrangement.

The aircraft, which is adapted to rise vertically from the ground and also adapted to travel at high speed in substantially horizontal flight requires a propeller that will satisfy both of these conditions, and to enable the aircraft, at times, to hover substantially stationary, with satisfactory propeller efficiency, and at other times to travel rapidly through the air at different speeds, as desired, each propeller has blades comprising a number of sections which are relatively adjustable to different pitch angles. Thus the blade 31 has an outer section 37 carried by a shank portion 38 which is rotatably mounted in the propeller hub for movement about the longitudinal axis of the blade. This motion, providing adjustment of the pitch angle of the section 37, is preferably accomplished by longitudinal movement of a collar 39, causing tilting movement of a lever arm 40 which is pivoted at 41 on a post 42 carried by the hub. The outer portion of the arm 40, which may be straight or of other suitable form, is provided with a link 43 pivotally connected to an ear or crank 44 projecting from a collar 45 which is fixed to the shank 38. Rotatably mounted on the shank 38 is the blade section 47, of suitable airfoil form in cross section. Fixed to the section 47 is a sleeve 49 which carries a collar 50 having a crank connected by link 51 to the lever 40. Inwardly of the section 47 and rotatably mounted on the sleeve 49 is a blade section 53, also of airfoil cross sectional form. A link 54 interconnects the lever 40 and a crank on this section 53.

The angles through which the blade sections 37, 47 and 53 move, as they are simultaneously adjusted, depend upon the lengths and relative angular relation of the several cranks to which the links 43, 51 and 54 are pivoted and upon the shape of the outer portion of lever 40. These parts are so related that, starting with the propeller in high pitch adjustment, corresponding to high speed in level forward flight, the angle of incidence of section 53 is considerably in excess of the angle of incidence of section 47, and the angle of section 47 is considerably in excess of the angle of section 37. Moving the control to decrease the pitches of the sections from this high speed condition, the angular adjustment of section 53 would be a little more than the angular adjustment of the section 47 and the angular adjustment of section 47 a little more than section 37 for the first part of the adjusting movement. As the control motion continues the angular adjustment of section 53 greatly exceeds that of section 47 and that of section 47 exceeds the adjustment of section 37 until finally all the sections have reached a small angle to the plane of rotation of the propeller, corresponding to the adjustment for vertical descent in autogyration, with the engines disconnected. The condition for vertical ascent is between the two end conditions just mentioned. Thus the propeller provides for an efficient propelling or lifting effect throughout the entire blade length when the aircraft is traveling at high speed through the air, when hovering substantially motionless in the air, when taking off, and during descent with the engines released from the propellers. During such descent, with the propellers auto-rotating, their sustaining effect is such as to prevent the aircraft from hitting the ground with a speed in excess of that which can be safely absorbed by the shock absorbing means. As the aircraft descends it is controlled as to position or attitude, as will be presently described.

The collar 39, which controls the pitch angle of the blade sections, is under the control of the operator, being provided with an annular track or groove receiving the ball end of the lever 40 which of course rotates with the propeller and with respect to the stationary collar 39. The collar 39 also operates the lever for the blade opposite through a mechanism which is similar in construction to one described. The collar is operated by an axially movable rod 56 which extends rearwardly to a control handle 65 which may be controlled by the operator to shift it forwardly or rearwardly as occasion may require.

Between the blade sections 37 and 47 is a blade section 52, hinged along a diagonal hinge line to the section 37 and connected by an operating pin 58 to an arm 59 projecting from the blade section 47 so that as the blade section 47 is turned, the inner part of the trailing edge portion of the section 37 is adjusted as to its blade angle.

The blades 34 and 35 of the lower propeller are also provided with adjustable blade sections similar in construction to the blade sections of the upper propeller. These blade sections are controlled by lever arms 60, operated by a rotatable collar 61 which rotates with the propeller shaft 23 but which is longitudinally movable along that shaft by a control tube 63 having a pin 64 extending through a longitudinal slot in the propeller shaft. The tube 63 at its inner end is provided with a collar 66 by means of which it can be longitudinally moved through operation of a control handle 68.

In case of failure of one of the engines, the construction is such as to permit the gears on the engine crankshafts to be moved out of mesh with the gears 22 and 25 or to permit the entire release of an engine or engines which may descend to the ground independently of the body. The engine 20, as shown in Fig. 1, is bolted to a carrying frame 70 which is provided with curved ribs 71 received in curved guide walls 72. The guides 72 are fixed to the engine supporting structure 73 which is secured to or forms a part of the frame structure of the body 10, the engine frame 70 normally resting against the supporting structure 73 and being held in that position by releasable locking devices shown in the form of pins 74, preferably conical in form and entering correspondingly shaped sockets in the guide walls 72 and also entering slots 75 in the ribs 71. With the engine in its normal position the inner sides of the pins 74 are at the ends of the slots and engage the inner portions of the curved ribs 71, but when the pins 74 are retracted, the engine can move outwardly, and is urged outwardly by a compressed spring 77 until the ends of the slots in the ribs are brought up against additional pins 78. The gear 21 is thus moved out of mesh with the gear 22.

If it is desired to drop the engine entirely, the pins 78 are retracted, thus removing restraint to continued outward movement of the engine, and the spring 77 forces the engine away from the longitudinal axis of the aircraft. In its outward movement, the engine is guided and controlled so that it will not strike the wing or strike one of the tail surfaces. Guide arms 80 project from the body structure and are arranged on opposite sides of a rigid bar 81 which is fixed to the engine frame 70 so that it will move with the engine, the lower end of the bar 81 bearing on a fulcrum pin 82 carried in fixed position by a supporting bracket 83 at a point considerably below the center of the engine. Additional guide arms 84 cooperate with the lower portion of the bar 81 and control its movements so that the engine will be forced to travel in a plane which intersects the longitudinal axis of the aircraft at an angle of about 45° to the surface of the wings. The fulcrum pin 82 is the center of curvature of the ribs 71 and the walls in which those ribs are guided. The engine is moved out far enough so that the bar 81 clears the guides 80 and 84, and then continues to move outwardly until the U-shaped lower end of the bar 81 can release itself from the pin 82, when the engine falls between adjacent tail surfaces. The end of the bar 81 is preferably connected by a cable 85 to a parachute 86 which is packed in a compartment in the empennage, and which may be pulled out automatically by the weight of the engine so that the engine can descend under the support of the parachute which is caused to open automatically in any suitable manner. In the same way, each of the other engines are similarly mounted and provided with their own individual parachute connections. Preferably each engine is connected to and forms a support for a portion of the skin or shell of the body, while the remaining portions of the skin or shell are fixed to the body frame itself. Thus as shown in Fig. 2, the engine 20 has fixed to it the shell wall 88, and the lower engine on the same side of the aircraft forms a support for the shell portion 89, while the shell portion 90 is fixed to the body frame structure. In Fig. 1 the aircraft is shown with the skin or shell portion 90 of the upper side of the body removed, for more readily revealing the construction.

The pins 74 are connected to pistons operable in cylinders 91, and these pins are simultaneously moved to retracted positions by supplying fluid under pressure to the outer sides of cylinders, through suitable supply pipes 92 which are connected to a suitable pressure supply source through a control valve which may be manually operated from the pilot's location. A second control valve is provided to supply fluid to the outer ends of the cylinders 93 to retract the pins 78, the pins 78 for any engine being controlled independently of the pins 74 of that engine, and independent controls being supplied for the several different engines so that they may be released or dropped independently.

When the engines are dropped, to relieve the body of their weight, the gasoline from the gas tanks 17 may be dumped by opening dump valves 93.

At the rear end of the body 10 is an empennage or tail structure 94 on which the aircraft is adapted to land in a substantially vertical descent under normal conditions. This tail structure is telescopically associated with the main body and is provided with a shock absorbing connection to absorb the shock of landing. As will be apparent from Figs. 1 and 2, the tail structure includes a frame 95 forming a support for horizontal stabilizing fins 96 and vertical fixed fins 97. Fixed to the frame 95 are a plurality of shock absorbing plungers 98 which are axially movable in the fluid pressure cylinders 99. The upper ends of the cylinders 99 are closed except for a by-pass opening which permits a restricted rate of flow of oil from the cylinders back through the pipes 100 to the reservoir 19 in which the shock absorber oil is stored. When landing, the upper ends of the cylinders 99 are in communication with the shock absorber oil reservoir through these restricted openings so that when landing, and the weight of the body is applied to the tail structure, the shock is gradually absorbed as the plungers 98 move upwardly into the cylinders. During such upward movement the stabilizing fins 96 and 97 travel along slots 102 in the sheet metal cover or skin 90 of the rear portion of the body, these slots being preferably reinforced along their edges to constitute guiding means for the stabilizing fin structure. As the tail collapses with respect to the body, the guy wires 104 which normally hold the tail structure quite rigid, are slackened or go loose. During flight, the shock absorbing plungers 98 are in their extended positions and are held so by latch levers 105 which engage notches in the plungers and hold them in their fully extended positions. After landing, and preparatory to launching again, the shock absorbing plungers 98 are moved to extended positions by the pilot who opens a control valve which establishes communication through a pipe line 106 connected to an engine driven pump so that oil may be forced from the shock absorber oil reservoir 19 to the upper sides of the cylinders 99, the flow through the restricted or leak orifices at the tops of the cylinders into the pipe 100 being prevented at this time by closing the valve 107. After the plungers 98 are fully extended the latch levers 105 are moved into latching position.

The fixed stabilizing fins 96 form a support for elevators 108 and 109, which are hingedly connected along hinge lines 110 and are provided with control horns 111 and 112. The vertical fins 97 pivotally carry the vertical rudders 113 and 114 having control arms or horns 115 and 116 respectively. At the outer ends of the vertical and horizontal fins are ground runners 117. These runners are preferably swiveling wheels carried by vertically extending piston rods 118 which may be provided with suitable auxiliary shock absorbing devices affording some yielding movement of the shafts with respect to cylinders 119 in which they are axially movable. As will be noted, these runners are mounted at points widely spaced from the longitudinal axis of the aircraft so that the latter will be supported in a stable position when on the ground, and are effective to promptly right the aircraft in case the latter descends in an inclined position. The lower end of the central portion of the tail structure 94 carries a main landing wheel 120 from which the main shock of landing is transmitted directly to the tail structure, the yielding upward movement of the ground wheels or runners 117 permitting landing on uneven ground or at an angle to the vertical without unduly straining the stabilizing fin structure.

The control of the rudders, elevators and ailerons during flight is accomplished by control mechanism located adjacent the pilot's seat. A suitable throttle control is also provided for the engines. As shown in Fig. 3 the control mechanism for the airfoil surfaces includes a control column 123 pivotally mounted on horizontal shafts 124 and 125 which are rotatably adjustable in bearings 126 carried by the body. The inner end of each of these shafts carries a bevel gear 127, meshing with a bevel pinion 128 which is rotated by shaft 129 carrying a bevel gear 130 at its upper end. The bevel gear 130 meshes with a bevel gear 131 fixed to the hand wheel 132. Rotation of the hand wheel thus causes movement of the shafts 124 and 125 in opposite directions. These two shafts are provided with control arms 133 and 134 respectively which are connected by cables 135 and 136 to the elevators 109 and 108. The connection to the elevators is such that as the control column as a whole is rocked forwardly or rearwardly from its normally upright position, it causes similar rotation of the shafts 124 and 125 in the same direction, and the elevators 108 and 109 are moved similarly in the same direction, forward rocking of the control column lowering the elevators. As the hand wheel 132 is turned about its own axis to differentially move the elevators, a differential movement of the ailerons is also produced through a cable connection to the aileron control shafts 137 and 138. These shafts are interconnected by a cable 139, and also by cables 140 and 141 which extend into passages in the shafts 124 and 125 and project through lateral openings in those shafts, being interconnected to a chain 143 guided over guide pulleys 144 and extending around a sprocket wheel 145 which is fixed to the bevel gear 131. The ailerons are thus moved differentially at the same time the elevators are moved differentially, so that the elevators and the ailerons cooperate to produce a roll in one direction or the other, depending upon the direction of rotation of the hand wheel. As the hand wheel is rotated, the vertical rudders are also moved differentially and cooperate with the elevators and ailerons to produce a rolling movement. This movement of the rudders is obtained from a cable connection between the horns 115 and 116 on the upper and lower rudders and pivoted levers 148 and 149 fixed to sleeves 154 which are rotatably movable about axes extending generally parallel to the control column 123. The sleeves 154 have projecting operating arms or horns extending longitudinally towards the tail structure and these horns are interconnected by a cable which is operated by the control wheel. As will be apparent from Fig. 3, the two control arms 115 and 116 at one side of the vertical axis are connected by control cables 150 and 151 to opposite ends of the lever 148, and the arms on the two vertical rudders at the other side of the vertical axis are connected by cables 152 and 153 to the lever 149. The rearwardly extending horn on lever 148 is connected at its rear end to a control cable 155 which is secured to the cable 140. The horn on lever 149 is connected by control cable 157 to the cable 141. As the control cables 140 and 141 are moved during aileron control, the levers 148 and 149 are caused to swing about their own axes to move the upper rudder in one direction and the lower rudder in an opposite direction.

During flight, the two rudders can be moved in the same direction by operating the rudder pedals 159 and 160 on which the arms 148 and 149 are pivotally carried. The rudder pedals, which have foot receiving bars arranged inside of the arms 148 and 149, are rotatably carried in suitable bearings 161 to rock forwardly and rearwardly from normal upright positions, under the control of the operator. As one pedal is moved forwardly the other moves rearwardly, operating the rudders in the same direction for steering purposes.

As will now be apparent, the aircraft is capable of high speed operation during flight, in which the sustaining planes are effective to provide adequate lift, and in horizontal flight full control is provided for roll and for directional control, the propeller being capable of adjustment to operate efficiently at various speeds of travel. When it is desired to land, the nose of the aircraft is pointed upwardly and the speed of the motors controlled so that the aircraft can descend, tail downwardly, the pitch of the propeller blade sections being adjusted to provide an efficient operation at times when the aircraft is moving comparatively slowly through the air. During descent and until the ground is reached, the controls are effective to turn the aircraft about its own longitudinal axis and to give a desired positioning of the aircraft axis with respect to the vertical. The ground may be approached slowly so that it might be unnecessary to use the shock absorbing connection between the empennage and the main body of the aircraft, but to fully cushion the shock of landing in case of a more rapid descent, the pilot operates the latch levers 105 so that the fluid pressure shock absorbers will be effective in permitting and cushioning telescoping movement of the empennage with respect to the main body portion. Fig. 1 shows the telescoped position of the empennage in dotted lines. The control for the tail surfaces is fully effective until the ground is reached, although the control cables connected to the tail surfaces slacken during telescopic movement of the tail portion. The ground engaging wheels cause the aircraft to be automatically righted in case its longitudinal axis is not vertical at the time of ground contact, and permit the aircraft to be readily moved about on the ground.

In case of engine failure of one of the engines, during flight, that engine may be disconnected from its propeller and a safe descent effected under the control of the other engine or engines, without dropping the stalled engine from the aircraft.

With only one engine driven propeller, in case of failure of the engine or engines which drive the other propeller, the torque tending to turn the body about its own axis can be effectively counteracted by turning the hand wheel and thus moving the ailerons differentially, and moving the elevators and rudders differentially to prevent rotation of the aircraft on its own axis.

In case all of the engines should fail, the engines may all be disconnected entirely from the aircraft and descend with their own parachutes, and the gasoline is dumped from the gas tanks. The propeller blade sections are then adjusted to their most efficient blade angles for auto-rotational operation, the rotation of the freely revolving propellers during descent providing adequate sustaining force for the main body, and the pilot, in view of the greatly reduced load with the engines separated from the aircraft.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an aircraft, a main frame, a propeller rotatably mounted in said frame, an engine carried by said frame for driving the propeller, means for disconnecting the engine from the propeller for autorotation of the propeller during descent of the aircraft with the propeller axis substantially vertical, a tail structure telescopically connected to the main frame for movement in a direction parallel to the propeller axis and adapted to receive the weight of the main frame while landing with the propeller axis substantially vertical, said tail structure having flight control surfaces, fluid controlled shock absorbing means between the main frame and the tail structure for cushioning the weight of the main frame during landing, and fluid pressure supply means for moving the tail structure to its extended position.

2. In an aircraft, a main body frame, a propeller rotatably mounted in said frame, an engine carried by said frame for driving the propeller, a tail structure forming a streamline continuation of the main body frame and telescopically connected to the main frame for movement in a direction parallel to the propeller axis and adapted to receive the weight of the main frame while landing with the propeller axis substantially vertical, fluid pressure shock absorbing means between the main frame and the tail structure for cushioning the shock of landing, fluid pressure supplying means under the control of the pilot for extending the fluid pressure shock absorbing means against the weight of the main body frame, and a controllable latch for holding the tail structure in extended position.

3. In an aircraft capable of vertical flight, a main frame, a propeller rotatably mounted in said frame, an engine carried by said frame for driving the propeller, means for disconnecting the engine from the propeller and from the main frame during flight, a tail structure having controllable airfoils extending to opposite sides of the longitudinal axis of the frame, fluid controlled shock absorbing means supporting said tail structure on the main frame for movement in the direction of the longitudinal axis of the frame and having a capacity for effectively cushioning the shock of landing of the main frame with the propeller axis substantially vertical, and control means connected to said airfoil surfaces and operable to move them in the same direction and in opposite directions at the will of the operator.

4. In an aircraft, a main frame, an engine mounted in said frame, a propeller rotatably mounted in said frame and having a blade formed of relatively adjustable sections, means for detachably connecting the engine in driving relation to the propeller, control means providing a predetermined differential control of the pitch angles of the sections of the blade during flight, and a tail structure telescopically connected to the main frame for movement in the direction of the propeller axis and adapted to receive the weight of the frame while landing with the propeller axis substantially vertical, and cushioning means between the main frame and the tail structure for absorbing the shock of landing.

5. In an aircraft, a main body, a plurality of oppositely rotating propellers rotatably mounted in said body, drive means in said body for said propellers, means for detachably connecting the drive means in driving relation to the propellers, said propellers having blades each comprising relatively movable blade sections of adjustable pitch angle, and means providing a predetermined differential control of the relative pitch angles of the blade sections during flight to impart greater angular movement to sections closer to the propeller axis than sections more remote from the propeller axis.

6. In an aircraft, a body, a propeller rotatably mounted in said body, an engine for driving the propeller, means for mounting said engine for movement outward of said body in a direction generally axially of the engine, means for releasably latching the engine on the body and operable to release the engine from the body and from the propeller, and means for controlling the relative outward movement of the engine from the body after the engine latching means is released.

7. In an aircraft, a frame structure, a propeller rotatably mounted in said frame structure, an engine for driving said propeller, releasable means for normally holding said engine in predetermined position on the frame structure and operable to release the engine from the propeller and for movement outward of the longitudinal axis of the frame structure while such longitudinal axis is arranged substantially vertically, guide means carried by said frame structure, and a pivotally mounted fulcrum arm carried by said engine and guided by said guide means for controlling the outward movement of the engine with respect to the frame structure to prevent the engine from striking projecting portions of the frame structure.

8. In an aircraft, a frame structure, a propeller rotatably mounted in said frame structure, means operable during flight for controlling the pitch angle of the propeller blades, an engine carried by said frame structure for driving the propeller, means for detachably connecting the engine in driving relation to the propeller, said frame structure having sustaining planes projecting outwardly with the tips of the planes having approximately the same distance from the longitudinal axis of the frame structure as the tips of the propeller blades, a tail structure telescopically connected to the frame structure for movement in the direction of the propeller axis, fluid controlled shock absorbing means for cushioning the shock of landing with the frame structure in a substantially upright position, said tail structure having laterally projecting stabilizing surfaces and elevators and having vertical fins and rudders extending substantially at right angles to the elevators and projecting to opposite sides of the longitudinal axis of the frame structure, and ground runners carried by said stabilizing surfaces and fins at points remote from the longitudinal axis of the frame structure.

9. In an aircraft adapted for vertical flight, a main body of generally streamline form, lateral sustaining planes projecting on opposite sides of the body, a tractor propeller at the nose portion of the body, an engine carried by said body for operating the propeller, means detachably connecting the engine to the propeller and to the body, said propeller having blade sections providing adjustment during flight of the pitch angle of a portion of a blade with respect to other portions at other distances from the propeller axis to provide autorotational effectiveness, an empennage having airfoil surfaces, means supporting the empennage for movement longitudinally of the body, and fluid controlled shock absorbing means for cushioning the collapsing movement of the empennage with respect to the body while landing on the empennage.

10. In an aircraft adapted for both forward flight and for landing and taking off on its tail, a frame, a tractor propeller rotatably mounted on said frame, said propeller having blades comprising relatively movable inner and outer blade sections mounted for relative rotational movement about the blade axis for pitch angle variation to provide autorotational effectiveness, controllable means for differentially controlling the pitch angle of the sections of a blade, and means actuated by said controllable means for adjusting said blade sections with relatively similar pitch for auto-rotation, with an inner section having a slightly greater pitch than an outer section for sustentation, and with an inner section having substantially greater pitch than an outer section for forward flight in the direction of the propeller axis.

11. In an aircraft adapted for both forward flight and for landing and taking off on its tail, a propeller having blades comprising a plurality of relatively adjustable blade sections disposed at different distances from the propeller axis, common means for simultaneously changing the pitch angle of the blade sections through different predetermined angles inversely in accordance with the distance of the section from the propeller axis, and means actuated by said common means for adjusting said blade sections with relatively similar pitch for auto-rotation, with an inner section having a slightly greater pitch than an outer section for sustentation, and with an inner section having substantially greater pitch than an outer section for forward flight in the direction of the propeller axis.

12. In an aircraft adapted for both forward flight and for landing and taking off on its tail, a propeller having blades each comprising an outer section and a pivotally mounted inner section of variable pitch angle and arranged remote from the blade tip, controlling means operable during flight to adjust the inner section on its pivot with respect to the outer section to alter its pitch angle and providing for forward flight of the aircraft substantially in line with the axis of said propeller, an engine for driving the propeller, and means for releasing the engine from the propeller to provide free rotation of the propeller in descent of the aircraft with its axis arranged substantially vertical.

13. In an aircraft adapted for vertical flight, a longitudinally extending main frame, a tractor propeller carried by said frame, an empennage carrying the frame in a substantially upright position thereon and on which landing is effected with the propeller axis substantially vertical, an engine for driving the propeller, a drive gear operated by the engine and in driving connection with the propeller, means on the frame normally supporting and securing the engine in normal position, means for releasing said engine supporting means providing for limited outward movement of the engine from the longitudinal axis of the frame to an extent sufficient to release the drive gear from driving connection with the propeller, and means to adjust the propeller for effective auto-rotation during descent of the aircraft with the propeller axis substantially vertical.

14. In an aircraft adapted for vertical flight, a main frame including a body of generally streamline form, a propeller carried by said frame, an empennage carrying the body in a substantially upright position thereon and on which landing is effected with the propeller axis substantially vertical, an engine for driving the propeller, means for adjusting the propeller for effective auto-rotation free from the engine, a drive gear operated by the engine and in driving connection with the propeller, means on the main frame supporting and securing the engine in normal position, means for releasing said supporting means providing for outward movement of the engine from the main frame axis to an extent sufficient to release the driving gear from driving connection with the propeller, and additional means operable to release the engine for continued outward movement entirely free of the frame.

15. An aircraft capable of vertical and horizontal flight and of vertical landing, comprising a main frame having a longitudinally extending axis and having laterally extending wings, a tail structure adapted to carry the main frame in a substantially upright position thereon and on which landing of the aircraft can be made, a fluid controlled shock absorbing connection between the tail structure and the main frame, an engine, a tractor propeller carried by the main frame, a quickly releasable connection between the engine and the propeller, and means mounting the engine on the frame for quick release from the frame and propeller during flight.

16. An aircraft capable of vertical and horizontal flight and of vertical landing, comprising a main frame having a longitudinally extending axis and having laterally extending wings, a tail structure including controllable airfoils and adapted to carry the main frame in a substantially upright position thereon and on which landing of the aircraft can be made, a shock absorbing connection between the tail structure and the main frame, an engine, a tractor propeller carried by the main frame and having controllable pitch blades, a quickly releasable gear connection between the engine and the propeller, and means mounting the engine on the frame for quick release from the frame and propeller during flight.

WALTER H. BARLING.